(12) United States Patent
Erickson et al.

(10) Patent No.: US 9,240,742 B1
(45) Date of Patent: Jan. 19, 2016

(54) CURRENT BOOST CIRCUIT

(71) Applicant: Seagate Technology LLC, Cupertino, CA (US)

(72) Inventors: Dale H Erickson, Edina, MN (US); James D Bucher, II, Montgomery, MN (US)

(73) Assignee: Seagate Technology LLC, Cupertino, CA (US)

( * ) Notice: Subject to any disclaimer, the term of this patent is extended or adjusted under 35 U.S.C. 154(b) by 124 days.

(21) Appl. No.: 14/099,558

(22) Filed: Dec. 6, 2013

(51) Int. Cl.
    *H02P 23/00* (2006.01)
    *H02P 7/29* (2006.01)

(52) U.S. Cl.
    CPC .................................. *H02P 7/2906* (2013.01)

(58) Field of Classification Search
    CPC .... G11B 5/54; G11B 19/2063; G11B 19/047; H02P 6/182; H02P 25/028
    See application file for complete search history.

(56) References Cited

U.S. PATENT DOCUMENTS

| 6,614,134 | B1 | 9/2003 | Davies |
| 6,894,553 | B2 | 5/2005 | Hulfachor |
| 7,078,829 | B2 | 7/2006 | Hunninghaus |
| 7,538,673 | B2 | 5/2009 | Balachandran |
| 7,633,702 | B1 | 12/2009 | Heimbaugh |
| 7,839,102 | B1 * | 11/2010 | Rana et al. ................. 318/254.1 |

FOREIGN PATENT DOCUMENTS

| FR | EP98310679.0 | 5/2006 |
| FR | EP12174924.6 | 9/2013 |

* cited by examiner

*Primary Examiner* — Karen Masih
(74) *Attorney, Agent, or Firm* — Cesari & Reed LLP; Kirk A. Cesari

(57) ABSTRACT

Systems and methods are disclosed for providing a current boost to support a voltage. In an embodiment, an apparatus comprises a voltage node; a switch coupled to the voltage node; a sensing circuit including an input coupled to the voltage node and an output for providing a corresponding voltage; and a voltage regulator coupled to receive the corresponding voltage and coupled to control the switch responsive to the received corresponding voltage. In an embodiment, a method comprises sensing a voltage; using a voltage regulator to turn on a switch responsive to the sensed voltage being less than a certain value; and providing additional current through the on switch to substantially maintain the voltage from being less than the certain value.

22 Claims, 8 Drawing Sheets

CURRENT BOOST CIRCUIT

SUMMARY

In an embodiment, an apparatus comprises a voltage node; a switch coupled to the voltage node; a sensing circuit including an input coupled to the voltage node and an output for providing a corresponding voltage; and a voltage regulator coupled to receive the corresponding voltage and coupled to control the switch responsive to the received corresponding voltage.

In an embodiment, an apparatus comprises a back electromotive force (BEMF) supply for generating a BEMF voltage; a current source; a switch coupled to the current source and the BEMF supply to conduct current from the current source when the switch is on to maintain the BEMF voltage not less than a certain voltage; a sensing circuit including an input coupled to the BEMF supply and an output for providing a voltage corresponding to the BEMF voltage; and a voltage regulator coupled to receive the corresponding voltage and coupled to turn on the switch responsive to the received corresponding voltage being less than the certain voltage.

In an embodiment, a method comprises sensing a voltage; using a voltage regulator to turn on a switch responsive to the sensed voltage being less than a certain value; and providing additional current through the on switch to substantially maintain the voltage from being less than the certain value.

DETAILED DESCRIPTION

In the following detailed description of the embodiments, reference is made to the accompanying drawings that form a part hereof, and in that are shown by way of illustration of specific embodiments. It is to be understood that other embodiments may be utilized and structural changes may be made without departing from the scope of the present disclosure. It is also to be understood that features of the various embodiments can be combined, separated, exchanged, or removed without departing from the scope of the present disclosure.

Figure 1:
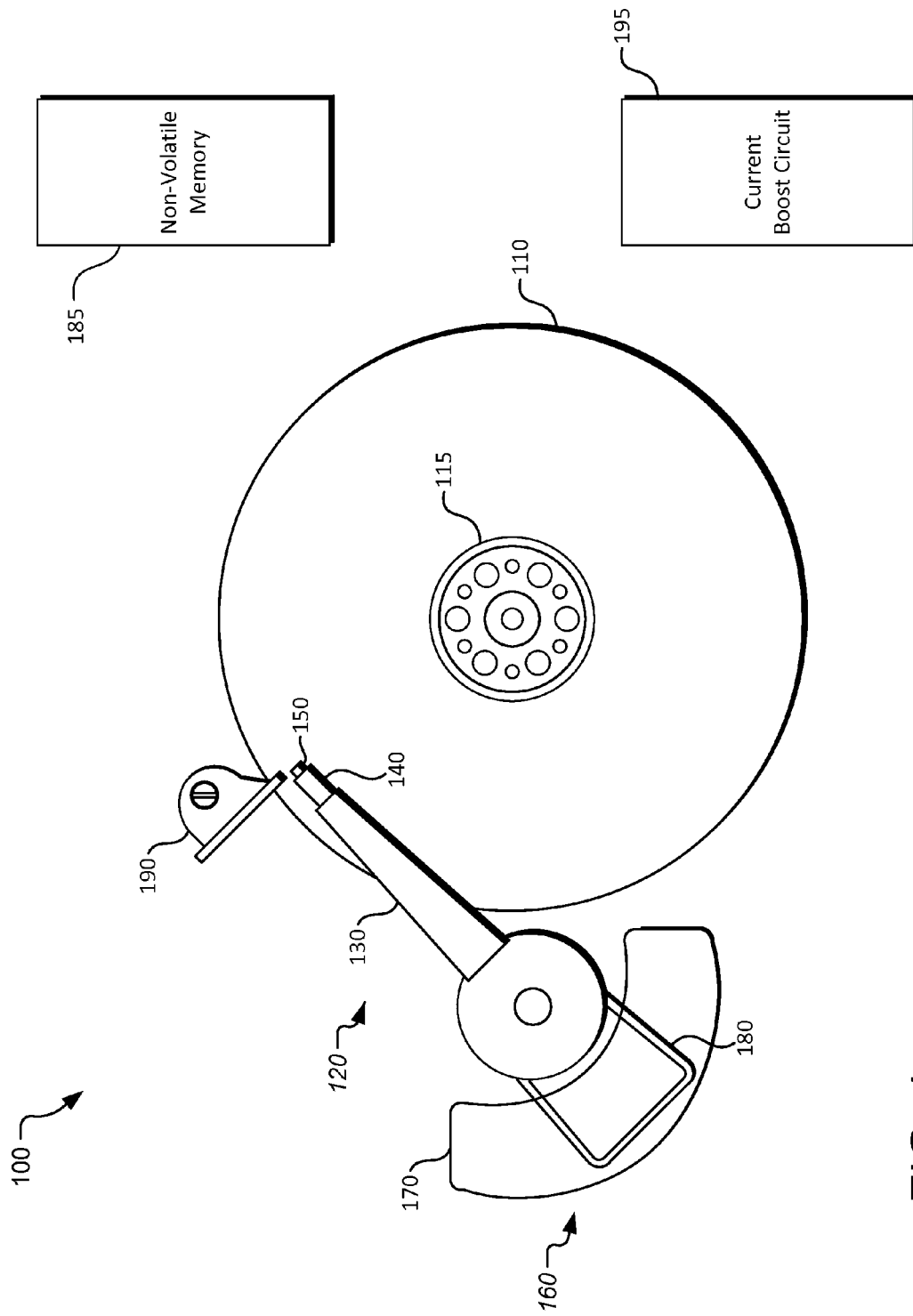
FIG. 1 is a diagram of a system with a current boost circuit, in accordance with certain embodiments of the present disclosure.

Referring to FIG. 1, a diagram of a system with a current boost circuit is shown and generally designated 100. The system 100 may be a hard disc drive (HDD) that can use a transducer to read and write data to a magnetic medium 110. The magnetic medium 110 can be spun by a spindle motor through the use of a clamp 115. An actuator assembly 120 can include actuator arm 130, slider 140 and tab 150. A transducer can be mounted on slider 140. Actuator assembly 120 may also include a voice coil motor (VCM) 160 that has a magnet 170 and coils 180. Current through coils 180 can create a magnetic field that interacts with magnet 170 to move the slider 140 and transducer with respect to the surface of magnetic medium 110.

System 100 can also include current boost circuit 195, which is used to provide a current boost to a voltage used by the system. Briefly, system 100 can use the back electromotive force (BEMF) of the spindle motor in the event of a power loss. The BEMF can be subjected to different electrical loads that can create transients in the BEMF. For example, the BEMF may have its voltage dip below a desired level because of a load. That voltage dip may not be desirable because other functions in system 100 may not tolerate the voltage dip. Therefore, the current boost provided by current boost circuit 195 is used to minimize the voltage dip. More details will be described after the following additional description of system 100.

The transducer may be very sensitive to physical contact. To avoid contact between the transducer and the magnetic medium, the magnetic medium 110 can be spun via the spindle motor to create an air bearing between the magnetic medium 110 and the slider 140. The air bearing can keep the transducer a distance from the medium. A landing zone 190 may be used to store the slider 140 away from the magnetic medium 110 when it is not in use. For example, the landing zone 190 may be positioned in an manner that extends in a direction directly over the magnetic medium 110, with a spacing between the landing zone 190 and the magmatic medium 110. The actuator assembly can be moved so that the transducer is parked by having contact between tab 150 and landing zone 190.

Non-volatile memory 185 can also be included in system 100 as an optional memory device. Non-volatile memory 185 can be used to save firmware for system 100, used as a cache, used as an addressable memory, used for other purposes, or any combination thereof.

Figure 2A:
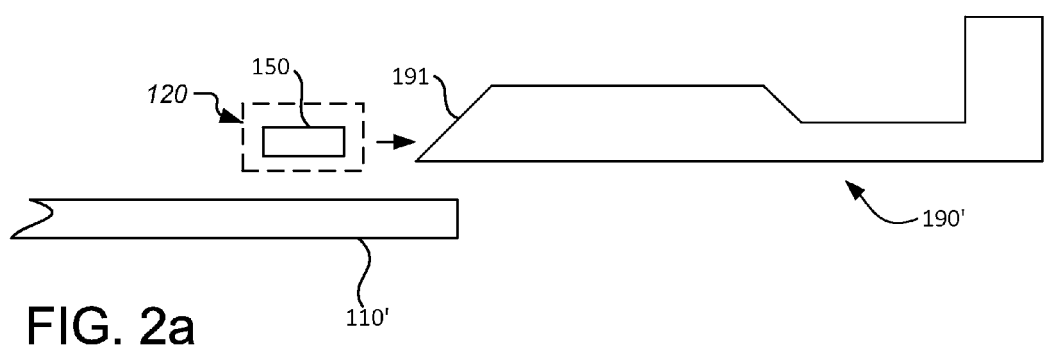
FIGS. 2a-b are plan views of a loading zone and tab that interacts with the loading zone, in accordance with certain embodiments of the present disclosure.
Figure 2B:
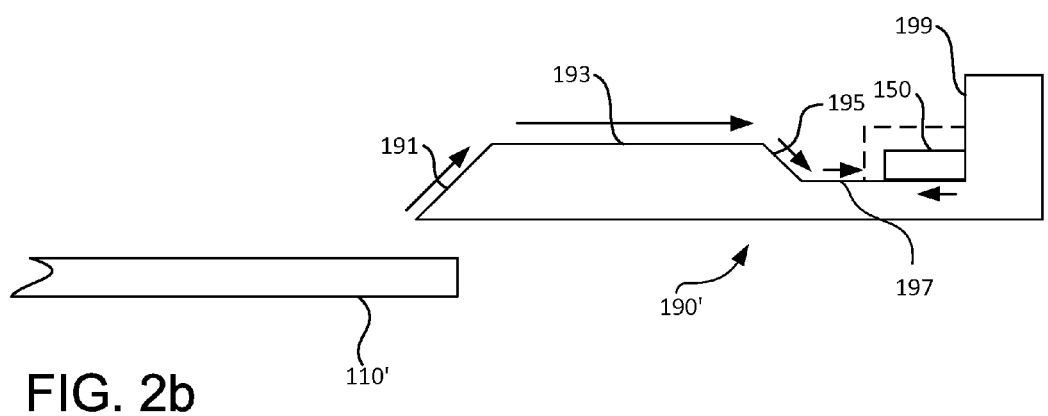

When system 100 is initially powered down, the momentum of the still spinning spindle motor and disks provides enough rotational speed to momentarily maintain the air bearing. In the meantime, actuator assembly 120 can move tab 150 into contact with landing zone 190. In more detail, FIGS. 2a-b show tab 150 being parked on landing zone portion 190'. In FIG. 2a, tab 150 is over magnetic medium portion 110'. Actuator assembly 120 is moving tab 150 in the direction of the arrow toward ramp 191. In FIG. 2b, tab 150 is shown in a parked position relative to landing zone portion 190'. Actuator assembly 120 may move tab 150 over ramp 191, plateau 193, decline 195 and notch 197 until it came into contact with stop 199. A natural response when tab 150 contacts stop 199 may be to bounce back in the direction of the arrow shown below tab 150. To counter this bounce, current can be applied periodically to actuator assembly 120 to move tab 150 back toward stop 199. This may ensure that tab 150 is parked in notch 197. When tab 150 is in its final position on landing zone 190, the transducer can be considered parked. This may maintain the transducer from any contact with the magnetic medium. The power can then be removed from the system.

If power to the system were suddenly lost during operation, the air bearing may not be maintained for long. At this point, however, the transducer may be over the surface of the magnetic medium. If corrective measures are not taken, the transducer may then contact the magnetic medium. Such contact can cause damage to both the transducer and medium. The resultant damage can be a loss of data where the medium was contacted or, worse, can be the inability to read any of the data stored on the surface of the medium because of the damaged transducer.

One corrective measure in the event of a power loss can be to use the voltage generated by the back electromotive force (BEMF) of the spindle motor. The BEMF can be used to safely park the transducer. The BEMF can also be used to provide power for other functions related to the power loss. For example, data in the volatile memory of system 100 may be written to non-volatile memory 185 to preserve it.

However, the BEMF may not have enough power to accommodate the safe parking and any of those other functions. This will be explained with reference to FIG. 3. There, the BEMF voltage may start to drop as shown by 300 during the initial parking of the transducer. The BEMF voltage may drop as shown by valley 310, then may start to regenerate. During the regeneration, the tab of the actuator assembly may bounce off the landing zone stop. In response, at peak 320 the BEMF may again can be applied to the actuator assembly to counter that bounce. The BEMF may drop as shown by valley 330, then may start to regenerate again. This may be repeated as shown by peaks 340, 360 and valleys 350, 370. After valley 370 the BEMF can be regenerated, but may not be applied to the actuator assembly. The transducer can be considered parked at this time.

Figure 3:
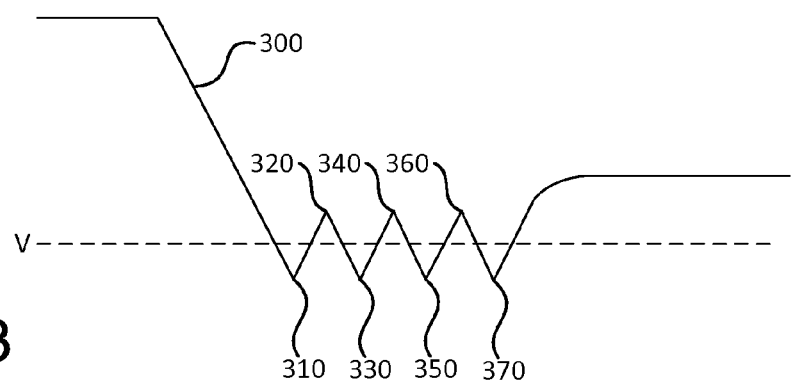
FIG. 3 is a graph that shows the voltage draw during the unloading of the transducer, in accordance with certain embodiments of the present disclosure.

As shown in FIG. 3, the BEMF voltage dips below a voltage V. One concern may be that when the voltage dip occurs, the voltage may be too low for circuitry in the system (e.g. HDD) to function properly. For example, dipping below voltage V may cause the system IC, such as a system-on-a-chip, to reset. If that reset happens before the system can write data to the non-volatile memory, the data can be lost.

Figure 4:
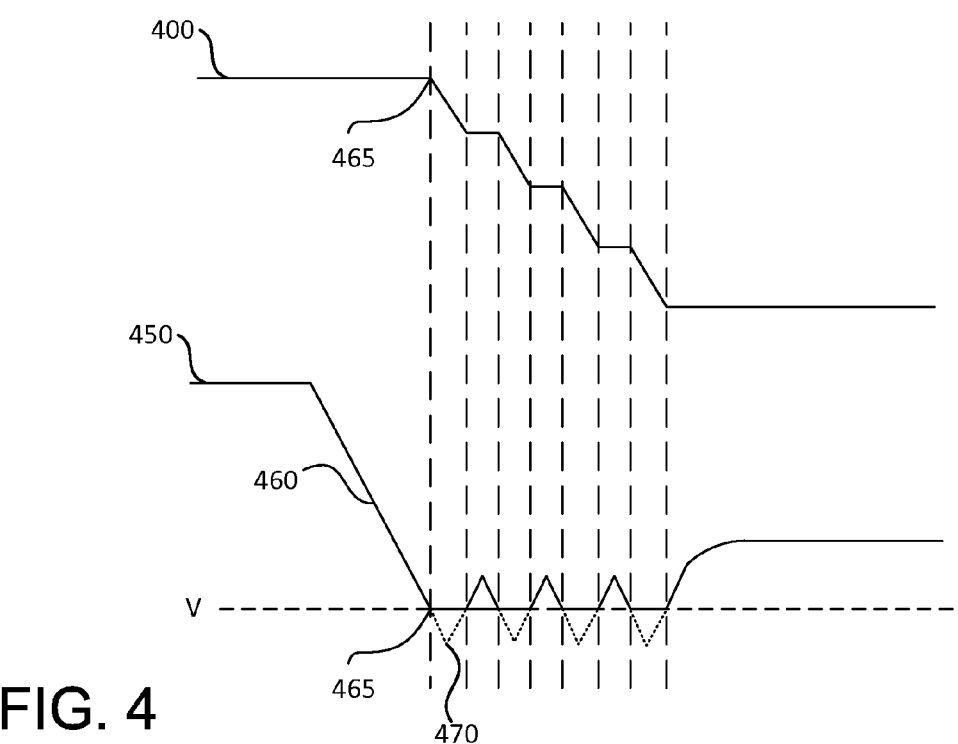
FIG. 4 is a graph that shows the desired voltage levels during the unloading of the transducer, in accordance with certain embodiments of the present disclosure.

One way to minimize the effects of the BEMF voltage dips may be to provide power to fill in the valleys. This is shown in FIG. 4. Here, a power reservoir voltage may be provided as shown as waveform 400. The BEMF voltage is shown as waveform 450. The BEMF voltage may start to drop as shown by 460 during the initial parking of the transducer. At time 465, unlike the BEMF waveform described for FIG. 3, the BEMF may not continue to drop as shown by valley 470 (shown in dotted line). Instead, the power reservoir can provide power at this time to steadily maintain the BEMF at voltage V. This is shown as the waveform 400 starts to decrease at time 465. The BEMF waveform 450 can continue to regenerate and deplete as explained for FIG. 3, but each time BEMF 450 may be approximately at voltage V, the power reservoir can provide power to maintain waveform 450 at voltage V. As shown by waveform 400, the power reservoir voltage may deplete as it is used to maintain BEMF waveform 450 at voltage V.

Figure 5:
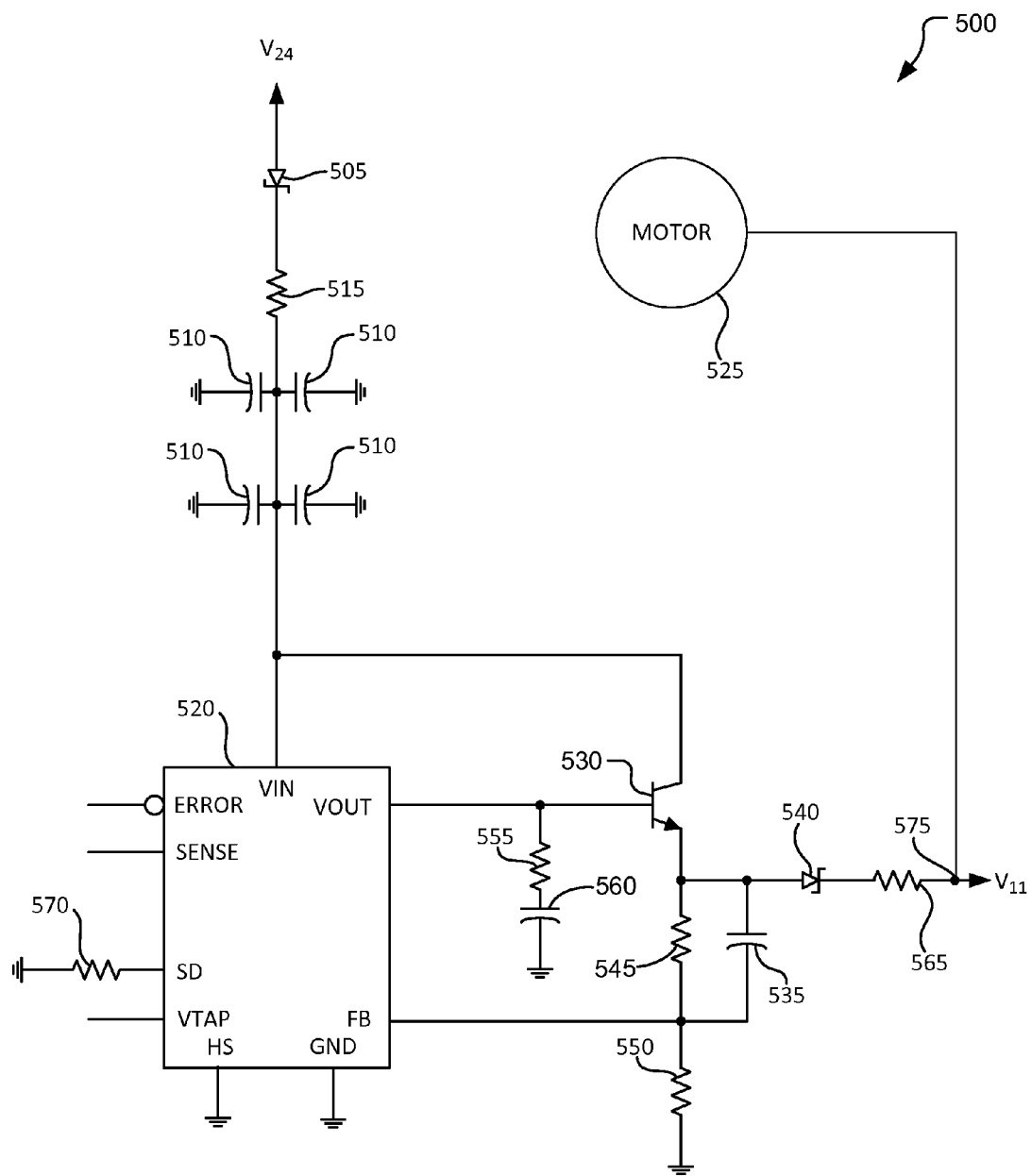
FIG. 5 is a diagram of a circuit that provides a current boost, in accordance with certain embodiments of the present disclosure.

An embodiment of a current boost circuit is shown as circuit 500 in FIG. 5. Briefly, a bank of capacitors can be charged from the voltage $V_{24}$ as an energy reservoir to potentially supply additional current during load transients that cause the voltage $V_{11}$ at voltage node 575 to dip. Voltage $V_{11}$ can be provided by the BEMF of motor 525 when power is lost. A regulator 520 also can be connected to the voltage $V_{24}$. If the voltage $V_{11}$ dips below the set point of regulator 520, energy can be extracted from the capacitor bank to support the load being supplied voltage $V_{11}$.

Figure 6A:
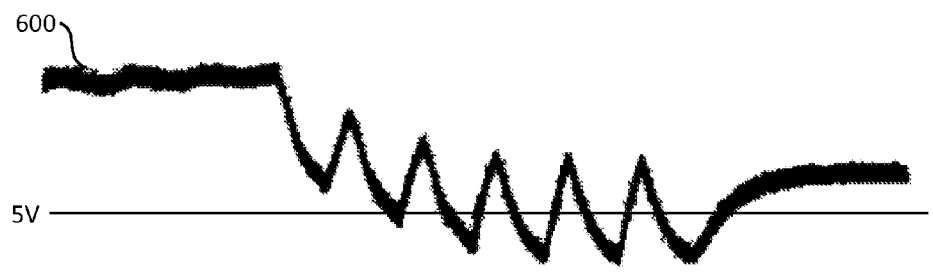
FIGS. 6a-b are waveforms of the operation of a circuit such as shown in FIG. 5, in accordance with certain embodiments of the present disclosure.

The operation of circuit 500 will be explained with reference to FIGS. 6a and b. FIG. 6a shows the BEMF waveform 600 when circuit 500 is disabled. Similar to FIG. 3, waveform 600 can start to decline during the retraction of the transducer. The peaks and valleys of waveform 600 can correspond to the transducer being parked in the notch of the landing zone. As shown, waveform 600 may dip below 5 v several times during the parking of the transducer. As explained for FIG. 3, this may cause circuitry to reset with the resultant loss of data. Waveform 610 shows the voltage provided by the power reservoir of circuit 500. In this case no power is provided from the reservoir since the current boost circuit is disabled.

Figure 6B:
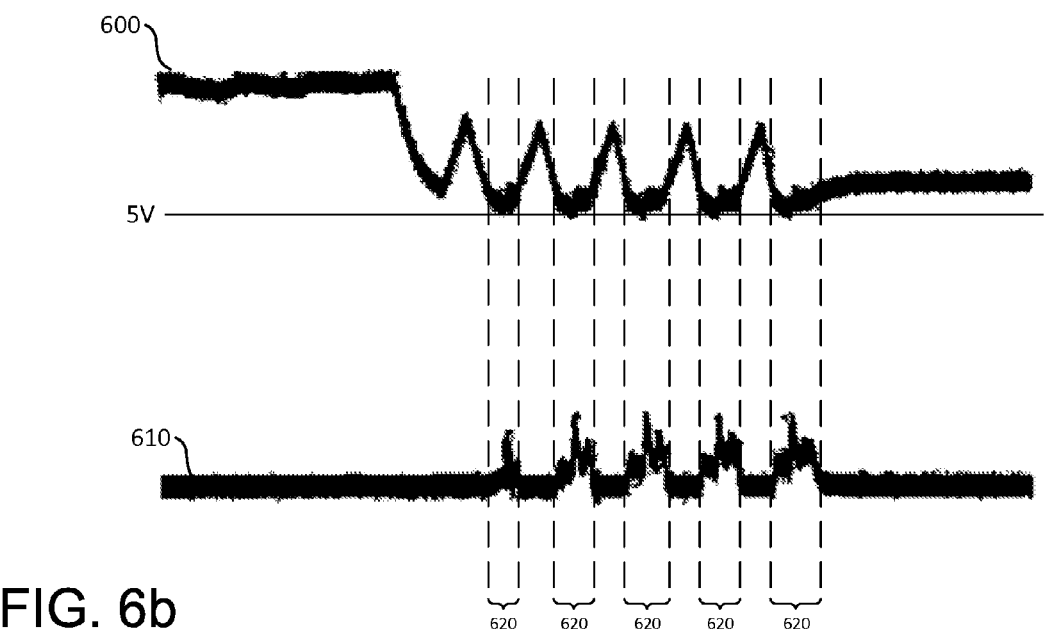

FIG. 6b shows the BEMF waveform 600 when circuit 500 is enabled. Waveform 600 may decline during the retraction of the transducer. The peaks and valleys of waveform 600 can correspond to the transducer being parked in the notch of the landing zone. Unlike FIG. 6a, waveform 600 may not go substantially below 5V because power from the power reservoir may be used to maintain the BEMF. This is shown as waveform 610 at time intervals 620, which may correspond with the parking of the transducer as associated with time intervals 620 of waveform 600. In this way no circuitry may be affected.

Additional detail of the operation of circuit 500 will now be explained. Capacitors 510 can be charged during normal operation of a system by voltage $V_{24}$. Transistor 530 may be off. Capacitor 535 can be charged to a voltage that is greater than the minimum voltage that voltage $V_{11}$ can be maintained during a power loss. That minimum voltage is exemplified by 5V in FIG. 6b. For example, the voltage of capacitor 535 can be equal to the minimum voltage of voltage $V_{11}$ (5V) plus the bias voltage of schottky diode 540. The voltage of capacitor 535 can be divided by resistors 545 and 550. The divided voltage can be input to the feedback pin FB of generator 520.

When there is a power loss, motor 525 can provide BEMF to generate voltage $V_{11}$. During this time circuit 500 may monitor voltage $V_{11}$. If voltage $V_{11}$ is about at its minimum voltage, schottky diode 540 can be forward biased. The voltage of capacitor 535 can drop as a result, which may cause the voltage from the resistors 545, 550 voltage divider to drop. This dropped voltage can be fed back into generator 520, which then can output a voltage on $V_{OUT}$ to turn on transistor 530. Power from capacitors 510 then can be conducted to maintain voltage $V_{11}$. This is shown as intervals 620 of waveform 610 in FIG. 6b.

Specific details for the devices in FIG. 5 are as follows. Generator 520 can be a low-quiescent current linear generator, such as an LP2951. Capacitors 510 preferably can be low-cost ceramic capacitors each being 10 µF 50 VDC. Transistor 530 can be a 45V, 1 A NPN medium power transistor such as BCX54. Capacitor 535 and resistors 545, 550 can be used as a sense circuit. Resistor 555 and capacitor 560 can be used to stabilize $V_{OUT}$. The values for the other devices are exemplified as: schottky diode 505 can be 30V 200 mW, such as BAT54HT1; resistor 515 can be 2 KΩ; capacitor 535 can be 100 pF; schottky diode 540 can be 30V 2 A, such as MBR230LSFT1; resistor 545 can be 12.4 KΩ, resistor 550 can be 6.81 KΩ; resistor 555 can be 1Ω; capacitor 560 can be 2.2 µF, resistor 565 can be. 25Ω; and resistor 570 can be 10 KΩ.

Capacitors may produce vibration due to the piezoelectric characteristics of the dielectrics. Capacitor vibration can cause rotational velocity noise, which causes increased bit error rate. However, since capacitors 510 can be connected to a regulated voltage $V_{24}$, signal noise injection does not cause capacitor vibration. Furthermore, the number and size of capacitors 510 can be chosen based on system physical constraints or timing considerations such as the amount of time needed to properly park the transducer.

Figure 7:
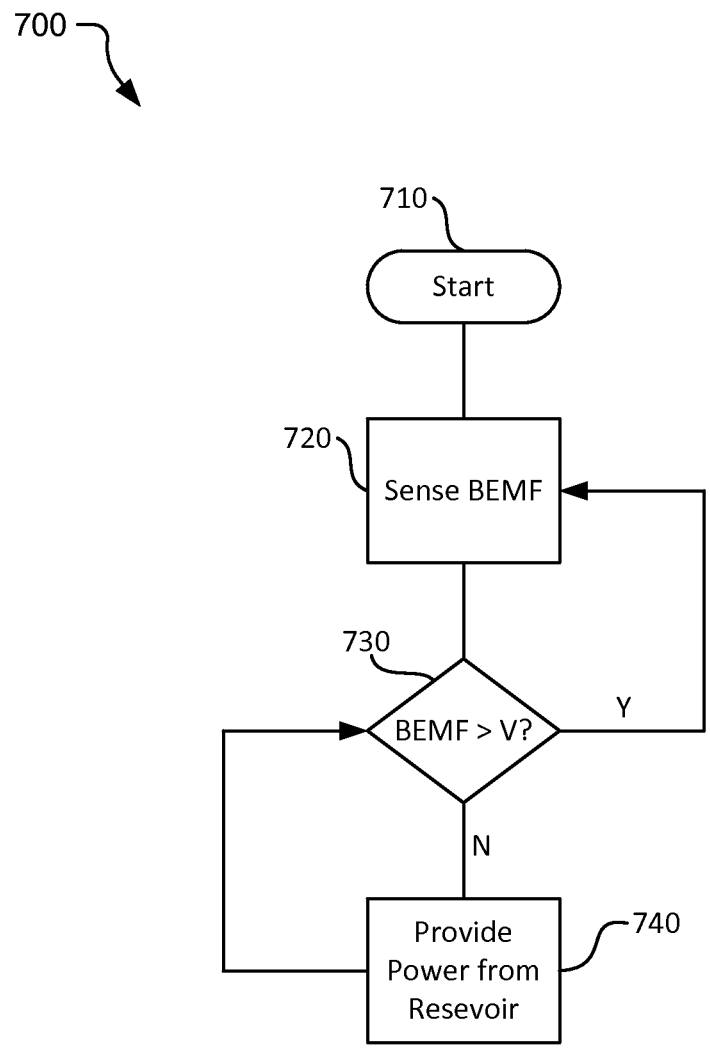
FIG. 7 is a flow diagram that shows a method of providing current boost by a circuit such as shown in FIG. 5, in accordance with certain embodiments of the present disclosure.

FIG. 7 is a flow diagram that shows a process 700 of providing current boost by a circuit such as shown in FIG. 5. Starting at step 710, process 700 can proceed to step 720 where the process can sense the voltage of the BEMF. Other indicators of the BEMF voltage can be detected, such as current. At step 730, process 700 may determine if the BEMF is greater than a certain voltage. That certain voltage can be predetermined, can be dynamic, or varied as needed. If the BEMF is greater than the certain voltage, process 700 can loop back to step 720. If the BEMF is not greater than the certain voltage, process 700 can proceed to step 740 where power can be provided to maintain the BEMF at or above the certain voltage. Process 700 can then loop back to step 730.

Figure 8:
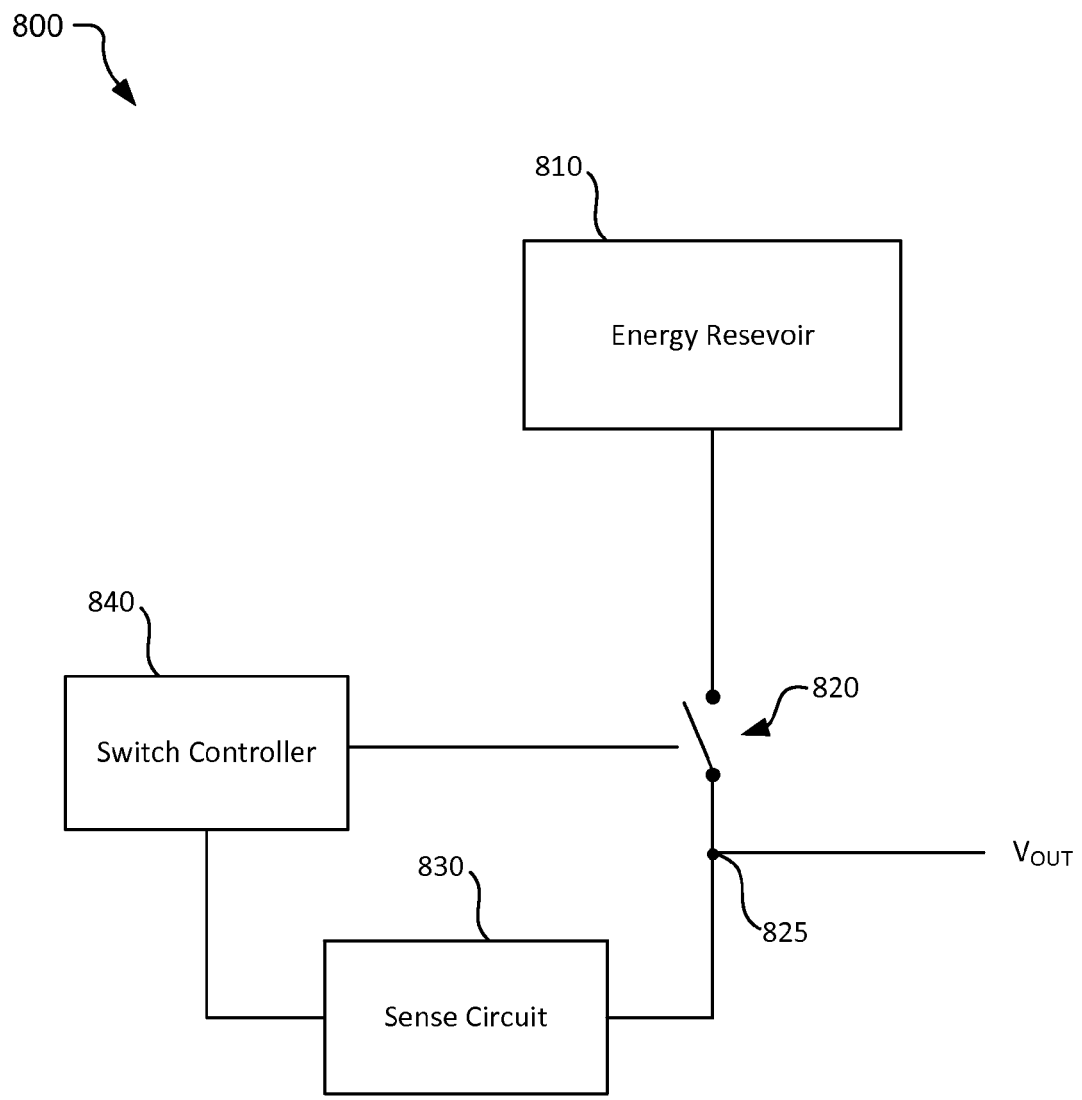
FIG. 8 is a block diagram of another circuit that provides current boost, in accordance with certain embodiments of the present disclosure.

FIG. 8 is a block diagram of another circuit 800 that provides current boost. Shown is an energy reservoir 810 that can be capacitors as described, or can be batteries or even a power source. Energy reservoir 810 may be coupled to support $V_{OUT}$ at voltage node 825 through a switch 820. Switch 820 can be a transistor as previously described, or can be a relay or other device that provides for power conduction. Sense circuit 830 can sense the voltage of $V_{OUT}$ and can provide a signal to switch controller 840. Depending on the functions of sense circuit 830 and switch controller 840, the signal can be a certain voltage or current, a digital bit, any voltage or current relative to a reference voltage or current, a multi-bit signal, an analog signal, etc. Responsive to the signal from sense circuit 830, switch controller can provide a control signal to activate switch 820. The control signal, like the signal from sense circuit 830, can be a certain voltage or current, a digital bit, any voltage or current relative to a reference voltage or current, a multi-bit signal, an analog signal, etc.

Figure 9:
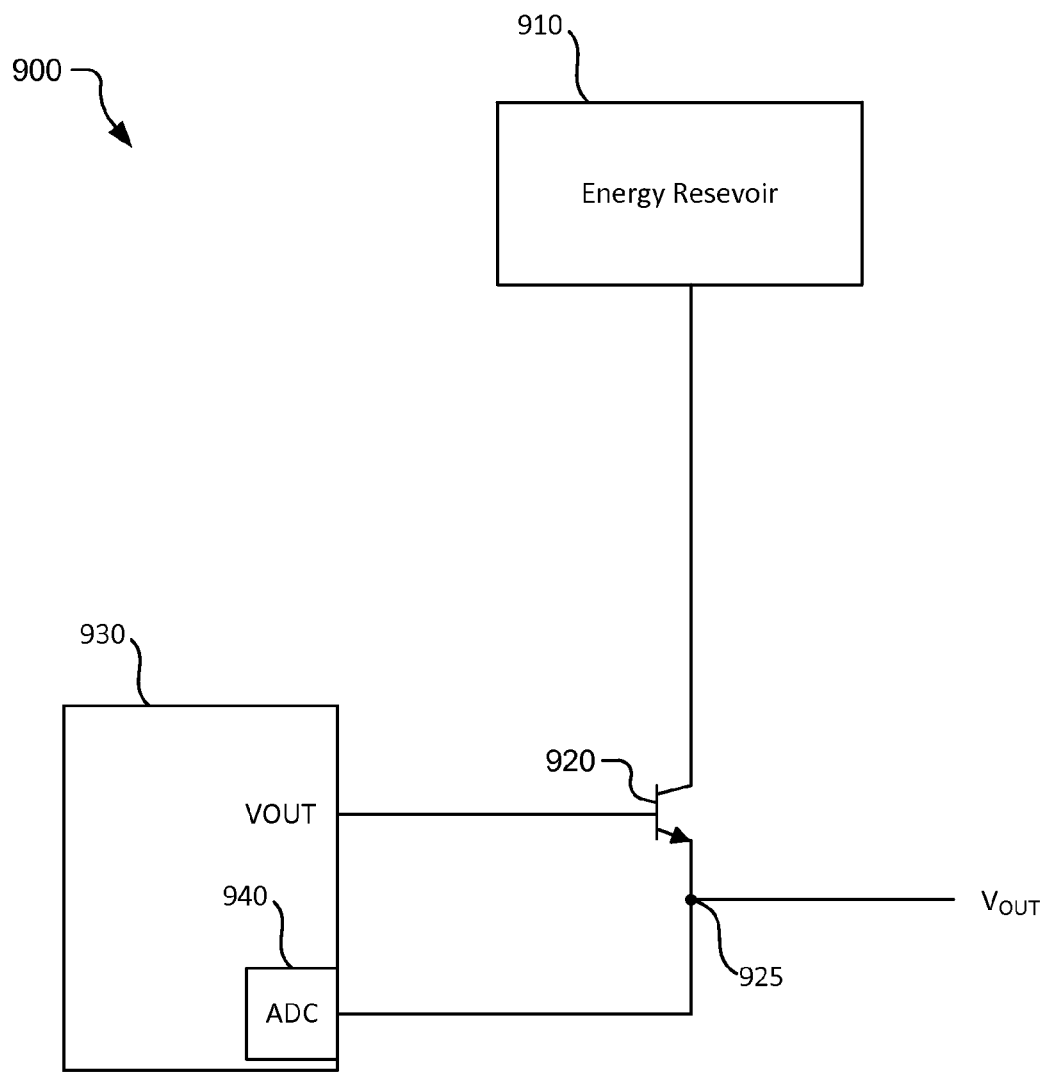
FIG. 9 is a block diagram of a further circuit that provides current boost, in accordance with certain embodiments of the present disclosure.

FIG. 9 is a further block diagram of another circuit 900 that provides current boost. Shown is an energy reservoir 910 that can be capacitors as described, or can be batteries or even a power source. Energy reservoir 910 can be coupled to support $V_{OUT}$ at voltage node 925 through a transistor 920. Switch controller 930 can be coupled to control transistor 920 and to receive $V_{OUT}$ as an input. Analog-to-digital converter 940 may convert the analog voltage of $V_{OUT}$ to a corresponding digital value. Responsive to the corresponding digital value, switch controller 930 can output a voltage to turn on transistor 920. On transistor 920 can couple energy reservoir 910 to node 925 to support the voltage $V_{OUT}$.

Switch controller 930 can be a microcontroller, CPU or DSP that includes ADC 940. Alternatively, ADC can be external to switch controller 930. Switch controller can be a custom IC or semi-custom IC that incorporates the function of switch 930, with or without ADC 940. Switch controller 930 can be configured with discrete components or a combination of discrete components and ICs.

Although embodiments were described with respect to parking a transducer, at least some of the embodiments described can be used to support power needs during load conditions. For example, the supported voltage can be used to power other circuits or devices that may demand power such that the without a supported voltage, inadequate power would be available. Also, the source of the voltage to be supported can be temporarily provides, such as from the BEMF or can be permanent, such as from a power supply.

Embodiments of the methods and apparatus described can be used in other devices besides an HDD. For example, the embodiments can be used in optical and tape drives, printers, systems that use arms such as robotics, etc. Furthermore, the embodiments can be used in systems where a minimal voltage is to be maintained to prevent an undesired effect such as resetting of integrated circuits. Examples of such systems are computers, engine control units, manufacturing, etc.

In accordance with various embodiments, the methods described herein may be implemented as one or more software programs running on a computer processor or controller device. In accordance with another embodiment, the methods described herein may be implemented as one or more software programs running on a computing device, such as a personal computer that is using a data storage device such as a disc drive. Dedicated hardware implementations including, but not limited to, application specific integrated circuits, programmable logic arrays, and other hardware devices can likewise be constructed to implement the methods described herein. Further, the methods described herein may be implemented as a computer readable storage medium or memory device, such as hardware components storing instructions that when executed cause a processor to perform the methods. Instructions for performing the methods disclosed herein may also be broadcast to a device for execution using computer readable transmission media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a back electromotive force (BEMF) supply for generating a BEMF voltage;
   a current source;
   a switch coupled to the current source and the BEMF supply to conduct current from the current source when the switch is on to maintain the BEMF voltage not less than a certain voltage;
   a sensing circuit including an input coupled to the BEMF supply and an output for providing a voltage corresponding to the BEMF voltage; and
   a voltage regulator coupled to receive the corresponding voltage and coupled to turn on the switch responsive to the received corresponding voltage being less than the certain voltage.

2. The apparatus of claim 1 further comprising an actuator assembly that is retracted using the BEMF voltage when the apparatus loses power.

3. The apparatus of claim 2 wherein the BEMF supply is a spindle motor.

4. The apparatus of claim 1 wherein the current source includes at least one capacitor.

5. The apparatus of claim 1 wherein the voltage regulator is low-quiescent current linear generator.

6. The apparatus of claim 1 wherein the switch is a power transistor.

7. The apparatus of claim 1 wherein the sensing circuit includes a voltage divider and another capacitor coupled to the BEMF supply in parallel.

8. The apparatus of claim 7 wherein the corresponding voltage is provided by the voltage divider.

9. The apparatus of claim 7 wherein a schottky diode is coupled between the BEMF supply and the parallel voltage divider and other capacitor.

10. An apparatus comprising:
a voltage node;
a switch coupled to the voltage node;
a sensing circuit including an input coupled to the voltage node and an output for providing a corresponding voltage; and
a voltage regulator coupled to receive the corresponding voltage and coupled to control the switch responsive to the received corresponding voltage.

11. The apparatus of claim 10 further comprising a current source coupled to the voltage node through the switch.

12. The apparatus of claim 11 wherein the current source includes at least one capacitor.

13. The apparatus of claim 11 wherein the voltage regulator and current source are coupled to a power supply.

14. The apparatus of claim 10 wherein the voltage regulator is low-quiescent current linear generator.

15. The apparatus of claim 10 wherein the switch is a power transistor.

16. The apparatus of claim 10 wherein the sensing circuit includes a voltage divider and another capacitor coupled to the voltage node in parallel.

17. The apparatus of claim 16 wherein the corresponding voltage is provided by the voltage divider.

18. The apparatus of claim 16 wherein a schottky diode is coupled between the voltage node and the parallel voltage divider and other capacitor.

19. The apparatus of claim 10 further comprising a back electromotive force (BEMF) supply coupled to the voltage node.

20. A method comprising:
sensing a voltage;
using a voltage regulator to turn on a switch responsive to the sensed voltage being less than a certain value; and
providing additional current through the on switch to substantially maintain the voltage from being less than the certain value.

21. The method of claim 20 further comprising providing the voltage from a BEMF supply.

22. The method of claim 21 further comprising retracting an actuator assembly using the voltage from the BEMF supply.

* * * * *